(No Model.) 2 Sheets—Sheet 1.
J. A. MARSELL.
DIE FOR THE MANUFACTURE OF AUGERS.
No. 408,497. Patented Aug. 6, 1889.
FIG. I.
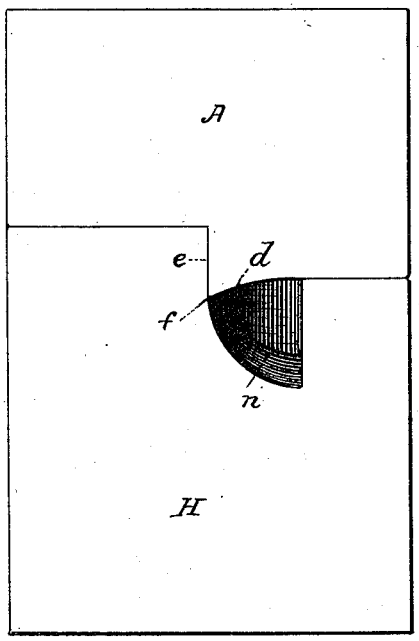
FIG. II.
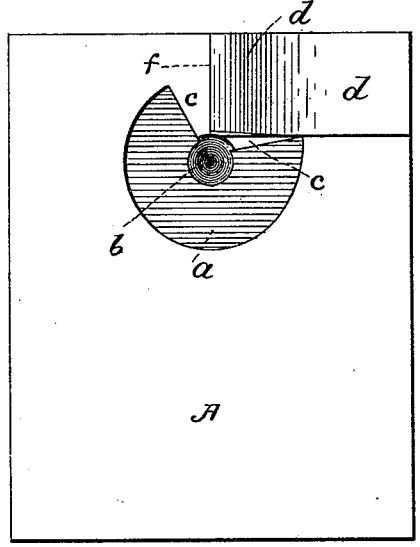
FIG. III.
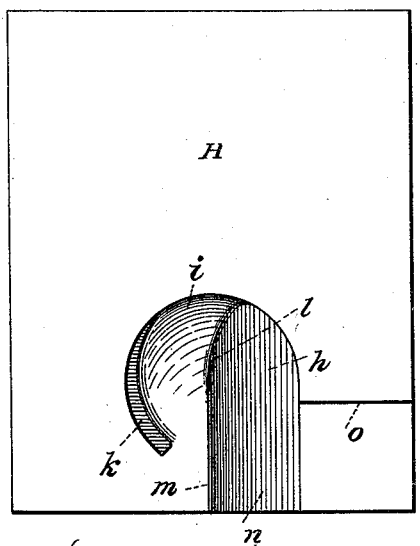
FIG. IV.
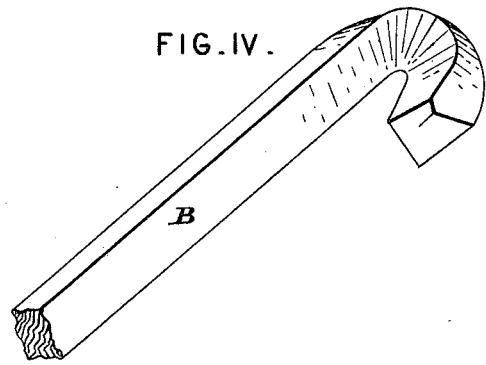
Attest.
Geo. T. Smallwood
H. S. Knight
Inventor
John A. Marsell
By Knight Bros.
Attys (No Model.) 2 Sheets—Sheet 2.
J. A. MARSELL.
DIE FOR THE MANUFACTURE OF AUGERS.
No. 408,497. Patented Aug. 6, 1889.
FIG. V.
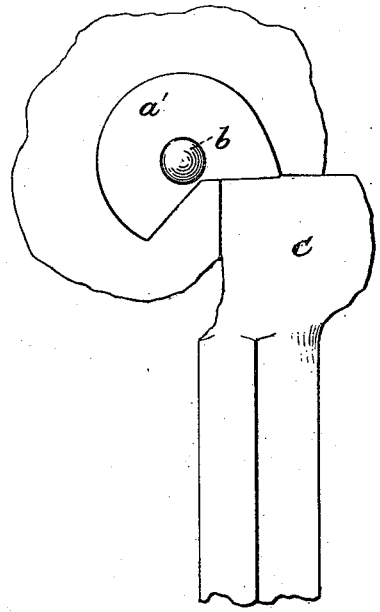
FIG. VII.
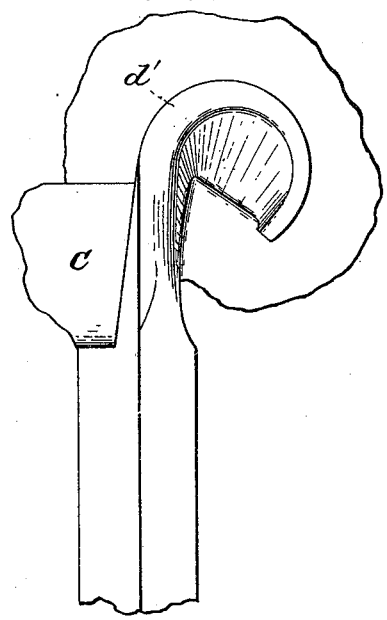
FIG. VI.
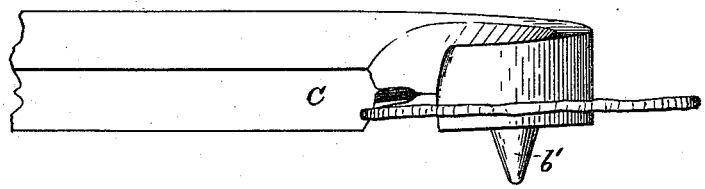
FIG. VIII.
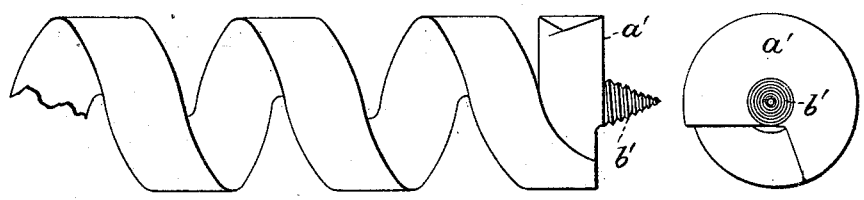
Attest.
Geo. T. Smallwood
H. S. Knight
Inventor
John A. Marsell
By Knight Bros.
Attys

UNITED STATES PATENT OFFICE.

JOHN A. MARSELL, OF BRIMFIELD, ASSIGNOR TO THE SNELL MANUFACTURING COMPANY, OF FISKDALE, MASSACHUSETTS.

DIE FOR THE MANUFACTURE OF AUGERS.

SPECIFICATION forming part of Letters Patent No. 408,497, dated August 6, 1889.

Application filed August 24, 1888. Serial No. 283,608. (No model.)

*To all whom it may concern:*

Be it known that I, JOHN A. MARSELL, a citizen of the United States, residing at Brimfield, in the county of Hampden and State of Massachusetts, have invented certain new and useful Improvements in Dies for the Manufacture of Augers, of which the following is a specification.

My invention relates to the manufacture of that class of augers commonly known as "ship-augers," and which are known in the art as "single-twist augers," which are formed by bending in a suitable machine a rod into spiral form, on the end of which is formed the head previous to the twisting.

The object of my invention is to simplify and therefore economize in the manufacture of such augers.

Heretofore in making this class of augers a long rod of metal was rolled into square or triangular form of the size required and cut into lengths necessary for each instrument. A piece of steel the proper size was upset and placed between the dies and the head formed thereon, the neck and head being turned by hand and the head being given the desired angle to the neck to correspond to the pitch of the twisting-machine, the said steel portion being welded, before or after swaging, to the above-mentioned rod. The hollow of the head also had to be chiseled out. After thus forming the rod and steel head the whole was passed through the twisting-machine to give the instrument its shape, after which it was finished in any well-known manner. In the dies heretofore used the recess for the neck was made to practically conform to the raw bar either in its bent or straight form, the head being bent down before or afterward, as the case required. In the old method of manufacturing ship-augers it was necessary to upset the rod, turn the head, turn the neck or shank, and chisel out the hollow portion in forming the cutting-lip, and then, with much labor, file the head to prepare it for the truing-lathe. In my improved method I do away with all these steps and form the head and the peculiar form of neck at a single swaging operation, ready to be twisted and put into the lathe for truing.

In order that my invention may be more fully understood, I will proceed to describe it with reference to the accompanying drawings, in which—

Figure I is a front view of the dies together. Fig. II is a bottom view of the upper die. Fig. III is a top view of the lower die. Fig. IV is a perspective view of the blank. Figs. V, VI, and VII are respectively a top, edge, and bottom view of the swaging; and Fig. VIII shows the finished auger.

A is the upper die, having the segmental depression $a$, in which is the central conical hollow $b$. The bottom of the depression $a$ is not plane, but, on the contrary, is slightly spiral, and is adapted to form the bottom of the auger-head $a'$, the segmental rise $c$ being adapted to form the opening in the head and lower cutting-edge, while the hollow $b$ provides the projection $b'$, on which is formed the conical screw.

$d$ is a lug formed on the upper die, slightly hollow on its face for forming the top of the opening for the neck of the auger $d'$, the side $e$ engaging the corresponding side of the upper die, while its sharp edge $f$ serves to cut through the web of the swaging and more completely form the neck of the auger.

B, Fig. IV, is the blank.

C, Fig. V, is the swaging.

H is the lower die, having the depression $h$, in which is formed the beveled projection $i$, extending transversely in the depression for forming the hollow, leaving the narrow circling channel $k$ on one side for forming the cutting-lip, and having the straight wall $l$ on the other side forming the side of the neck-opening and lying in the same vertical plane with the side $m$, which engages with the side $e$ of the lug $d$ of the upper die to guide the dies when they come together. The straight channel $n$, forming the lower portion of the neck-opening, is made to slope outwardly, the sharp cutting-edge of the upper die and the vertical wall and sloping bottom of the neck-opening in the lower die nearly meeting, so that the neck is substantially semi-elliptical in cross-section, the outer side being flat and the inner portion being rounded.

$o$ is a shoulder for engaging the inner vertical side of the outer portion of the lug $d$, for aiding in maintaining the proper relative positions of the dies. The neck, by virtue of its peculiar construction, is ready for the twisting-machine without being bent at an angle to the head, it being my practice to place the auger-blank as seen in Fig. 5 after trimming off the fin, and with the neck extending in substantially the same plane with the head directly into the twisting-machine after welding it onto the rod, if such be desirable, or the head may be made on the long rod and welding avoided.

In preparing the blank for the swaging the rod is preferably square and bent in the plane of one of its diagonals.

By making augers in my improved way I am enabled to save considerable expense, time, and labor, for it is evident that the several steps in the procedure of manufacture as heretofore carried on are dispensed with.

Having thus described my invention, the following is what I claim as new therein and desire to secure by Letters Patent:

1. The herein-described dies for making the heads of single-twist augers, having the neck-opening formed by the parts $d$ and $n$, said part $d$ having the cutting-edge $f$ for completing the neck, as set forth.

2. The herein-described dies for making single-twist augers, which consist in the head-cavity $a$, of substantially the form shown, and the semi-elliptical neck-opening lying without the plane of the head-cavity, whereby the article is made ready for the twisting-machine without bending, chiseling, or filing, as described.

3. The herein-described dies for making single-twist augers, which consist in the dies A and H, said die A having the segmental depression $a$, conical hollow $b$, projection $c$, and lug $d$, and the die H having the depression $h$, bevel projection $i$, circling channel $k$, and channel $n$, whereby the cutting-edge $a'$, opening $c'$, screw-nib $b'$, hollow $i'$, cutting-lip $k'$, and neck $d'$ are formed at a single operation and the auger ready for the twisting-machine and lathe without bending, chiseling, or filing, as explained.

JOHN A. MARSELL.

Witnesses:
A. J. DANICH,
W. A. GILBERT.